Feb. 19, 1957  F. AASMA  2,782,309
FREQUENCY STABLE MULTIVIBRATOR
Filed July 7, 1954  2 Sheets-Sheet 1

INVENTOR
FELIX AASMA
BY
ATTORNEY

Feb. 19, 1957  F. AASMA  2,782,309
FREQUENCY STABLE MULTIVIBRATOR
Filed July 7, 1954  2 Sheets-Sheet 2

INVENTOR
FELIX AASMA
By [signature]
ATTORNEY

United States Patent Office 2,782,309
Patented Feb. 19, 1957

2,782,309
FREQUENCY STABLE MULTIVIBRATOR

Felix Aasma, Jarnbrott, Sweden, assignor to Telefonaktiebolaget L. M. Ericsson, Stockholm, Sweden, a corporation of Sweden Application July 7, 1954, Serial No. 441,889

Claims priority, application Sweden July 8, 1953

5 Claims. (Cl. 250—36)

The present invention refers to a multivibrator, the frequency of which is particularly stable.

In multivibrator circuit arrangements as heretofore known the time, at which the multivibrator switches from one position to another, is relatively undetermined, since said time is depending on the transconductance, the cut-off voltage and the bias of the tubes and on the possible hum and noise voltage on the grid of the tubes. The frequency of the multivibrator is therefore not very stable. A known method of increasing the frequency stability is to connect the grid leaks of the tube to a positive bias.

The present invention relates to a multivibrator circuit arrangement providing a higher frequency stability than can be obtained with a positive grid bias.

The invention is characterized by a transformer, the primary winding of which is connected in series with one or both anode resistances of the multivibrator, and the secondary winding of which lies between the grid and the cathode in series with one or both grid leaks and is turned so that positive feed-back is obtained, one or both windings being tuned to the desired multivibrator frequency.

Figure 1:
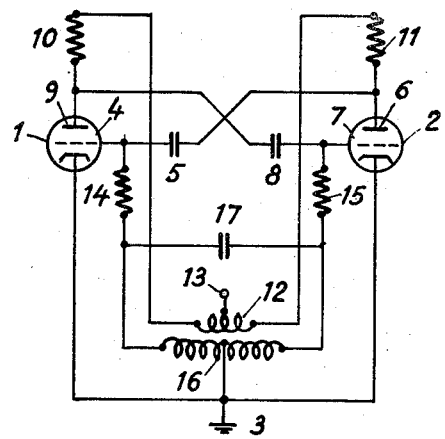
Figure 2:
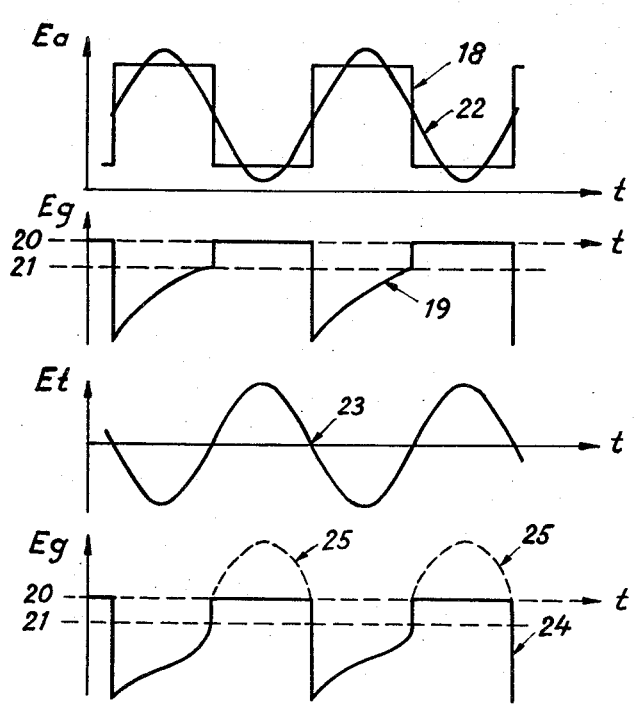
Figure 3:
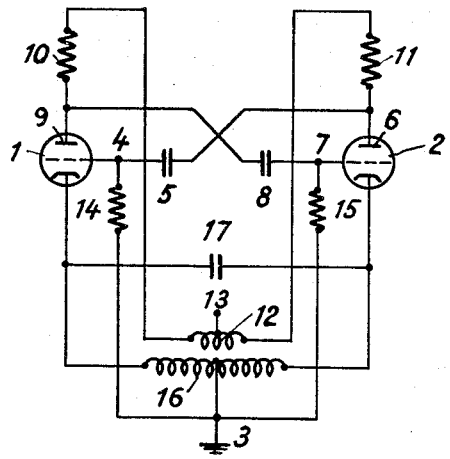
Figure 4:
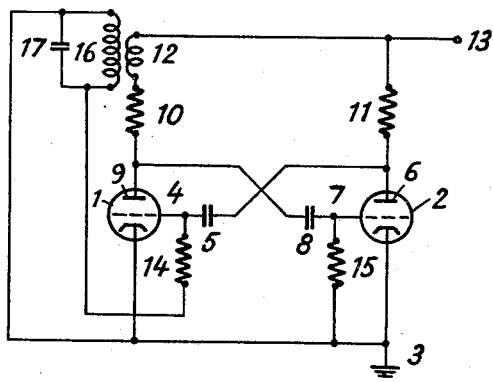

The invention will be described more closely with reference to the accompanying drawing, in which Fig. 1 shows an embodiment of the invention, Fig. 2 illustrates the operating manner of the device according to Fig. 1, and Figs. 3 and 4 show two further embodiments of the invention.

Fig. 1 shows a multivibrator connection according to the invention, 1 and 2 being two electron tubes, the cathodes of which are connected to earth, 3. The control grid 4 of the tube 1 is connected over a capacitor 5 to the anode 6 of the tube 2 and the control grid 7 of the tube 2 is in the same manner connected over a capacitor 8 to the anode 9 of the tube 1. Each one of the anodes 9 and 6 are, over their anode resistances 10 and 11, respectively, connected to respective ends of the primary winding 12 of a transformer. The mid tapping of the winding 12 is connected to the source 13 of anode voltage. Each one of the control grids 4 and 7 are connected over their grid leaks 14 and 15, respectively, to respective ends of the secondary winding 16 of said transformer, the mid tapping of the secondary winding being connected to earth. The winding 16 is connected in parallel with a capacitor 17. If the terminals of the winding 12 of the transformer were directly connected with the source 13 of anode voltage and the terminals of the winding 16 were directly connected to earth, the circuit system according to Fig. 1 would constitute a well known type of multivibrators, the operating manner of which is also so well known, that it does not need to be described in this connection.

The curve 18 in Fig. 2a shows the approximate course of the voltage on an anode E$a$ as a function of the time $t$ in such a well-known multivibrator. The same voltage is on the whole also obtained with a multivibrator according to the invention. The curve 19 in Fig. 2b shows the voltage E$g$ on the control grid of a tube, the anode potential of which varies according to the curve 18 in the well-known multivibrator. The line 20 in Fig. 2b indicates a control grid voltage of zero volt in relation to the cathode of the tube, whereas the line 21 indicates the control grid voltage at which the cathode current of a tube is cut-off. During the time interval, in which the cathode current of a tube is cut-off, its control grid potential 19 varies along an exponential curve, the time constant of which is on the whole equal to the product of the resistance and the capacitance of the resistor and the capacitor, respectively, which are connected to said control grid. When the grid potential reaches the value, at which the tube begins to be energized, a quick switching takes place in the multivibrator, so that the previously blocked tube is quickly energized with full cathode current, whereas the previously energized tube is quickly blocked. At the time, at which the switching is to take place, the curve 19 is not very steep, and therefore a small variation of the cut-off voltage 21 of the tube can cause a rather great variation of the time for the switching of the multivibrator and therewith of the frequency of the multivibrator. In order to obtain a more stable multivibrator frequency, the curve 19 must be steeper at the time for the switching of the multivibrator. In order to obtain this, it is known to connect the grid leaks of the tubes not to earth but to a positive voltage. The curve 19 then tends to move to a final level higher than the level 20 in Fig. 2b.

If, according to the invention, a transformer with one or both windings tuned to the desired multivibrator frequency is connected to the multivibrator as in Fig. 1, a considerably more frequency-stable multivibrator is obtained, than according to the last mentioned method. The curve 22 in Fig. 2a indicates the fundamental frequency of the anode voltage shown in the curve 18. Part of the energy of the alternative anode voltage is over the transformer 12, 16 fed to the oscillating circuit 16, 17. Thus a chiefly sinusoidal voltage E$t$ appears in said oscillating circuit according to the curve 23 in Fig. 2c. The windings of the transformer are directed so that the fundamental frequency of the anode voltage curve for the anode of one of the tubes is added to the control grid voltage of the same tube in counter phase. If thus the curve 22 indicates the fundamental frequency of the anode voltage for the anode 9, the curve 23 indicates the voltage arising at the point of connection between the resistance 14, the capacitor 17 and the secondary winding 16. The result is, that the potential on the control grid 4 will consist, broadly speaking, of the sum of the sinusoidal voltage 23 and the control grid voltage 19. The course of the total voltage is evident from the curve 24 in Fig. 2d. The positive peaks 25 of the superimposed sinusoidal voltage are cut owing to grid current. Line 20 in Fig. 2d indicates a grid voltage of zero volt in relation to the potential of the cathode, and line 21 indicates the grid voltage, below which the current of the tube is cut-off. The curve 24 is obviously much steeper than the curve 19 in Fig. 2b at the time, at which the respective curves reach the cut-off voltage 21 and the multivibrator switches. This depends on the sinusoidal voltage 23 fed to the grid leak from the oscillating circuit being steepest at that time. Thus, the time, at which the multivibrator switches, is relatively well defined and substantially independent of possible variations of the cut-off voltage level 21. A mulitivibrator according to the invention is therefore considerably more frequency-stable than the multivibrators known heretofore, and its frequency is chiefly determined by the resonance frequency of the oscillating circuit. By varying the resonance frequency of the oscillating circuit, the frequency of the multivibrator can easily be varied within a relatively great frequency range. The stabilizing is however best if the natural frequency of the multivibrator (i. e. the frequency of the multivibrator were the transformer 12, 16 not existing) is somewhat lower than the natural frequency of the oscillating circuit.

In order to obtain a good stabilizing effect it is desirable that the sinusoidal voltage arising between the grid and the cathode has a great amplitude. In the anode circuit, however, as small a purely sinusoidal voltage as possible is required. To obtain the fundamental frequency from the anode it is possible to use an impedance in series with the anode resistance, said impedance having a certain value for the fundamental frequency but preferably being nearly zero for all other frequencies. Said impedance should however also be relatively small for the fundamental frequency in order not to deform considerably the rectangular curve shape of the anode voltage. It is therefore suitable to transform to a higher voltage the sinusoidal voltage fed from the anode circuit to the grid-cathode-circuit. This presents no practical difficulties, since the oscillating circuit is practically unloaded. It is only loaded by one grid leak at a time, the resistance of the grid leak thereby being very great.

The multivibrator according to Fig. 1 is usually symmetrical, i. e. the impedances connected to the respective electrodes in both tubes have the same value. The curve 18, which indicates the alternative anode voltage, is therefore symmetrical. The multivibrator may however be made somewhat unsymmetrical, for example by giving both cathodes somewhat different potentials.

Fig. 3 shows a somewhat modified embodiment of the multivibrator according to Fig. 1. In Fig. 3 both grid leaks 14 and 15 are connected directly to earth, 3, whereas the cathodes of the tubes are instead connected to the terminals of the secondary winding 16. The capacitor 17 is also in this case connected in parallel with said secondary winding, i. e. it is here connected between the cathodes of the tubes. Otherwise, the multivibrator according to Fig. 3 is connected in the same manner as the multivibrator according to Fig. 1. The windings of the transformer are here also directed so that the fundamental frequency of the anode voltage of the anode of one of the tubes is added to the grid voltage of the same tube in counter phase. Since said fundamental frequency is in this case fed between the cathode and earth instead of being fed between the grid and earth as in the previous case, one of the windings of the transformer, for example the winding 12, should be directed opposite to winding 12 in the circuit system according to Fig. 1. The device according to Fig. 3 functions in the same manner as the device according to Fig. 1.

Fig. 4 shows another embodiment of a multivibrator according to the invention. The device according to Fig. 4 is based upon the same fundamental type of multivibrators as the other devices. Here the primary winding 12 of the transformer is however connected in series with one only of the anode resistances, and the secondary winding 16 is connected in series with one only of the grid leaks 14 and earth. The capacitor 17 is here also connected in parallel with the secondary winding 16. The device acts in such a manner that only the switching of the multivibrator in one direction is stabilized. The frequency of the multivibrator is however relatively stable even in this case. If the corresponding impedances for both tubes have the same value, said multivibrator will also be symmetrical if the natural frequency of the oscillating circuit is equal to the natural frequency of the multivibrator without stabilizing.

In the previous description, it has been assumed that the secondary winding of the transformer is tuned. It is evident, that the primary winding of the transformer may be tuned instead. The oscillating circuit arising in the anode circuit or anode circuits should then be dimensioned with a relatively small inductance and a relatively great capacitance to prevent the impedance arising in series with the anode resistance or anode resistances from being too great.

It is obviously also possible to tune both, the primary and the secondary winding of the transformer.

The device according to Fig. 4 may also be modified in several different manners. Thus, the secondary winding may for example, if the primary winding 12 is connected between the anode resistance of a tube and the source 13 of anode voltage, be connected between the cathode of the same tube and earth or between the grid leak of the other tube and earth, or between the cathode of the other tube and earth.

It has been assumed in the previous description that the grid leaks of the multivibrator were connected to the same D. C. potential as earth. They may however also be connected to a D. C. potential which is positive in relation to the cathodes, for example to point 13.

The invention is furthermore applicable not only to the shown fundamental type of multivibrators, but also to stabilize the frequency of other known multivibrators. Thus, the fundamental frequency of the anode voltages has in the embodiments shown in the figures been fed back between the control grid and the cathode. It is evident, that the feed back may also be effected between another grid than the control grid and the cathode. Thus only a few examples of the invention have been referred to in the description and the invention is naturally not limited to said examples only, but should be more evident from the attached claims.

I claim:

1. A frequency stable multivibrator system comprising first and second electron discharge means, each having an anode, a cathode and a grid, a resistive energizing circuit connected to the anode of each discharge means, positive feed back circuit means connecting the anode of each discharge means with the grid of the other discharge means, at least one of said feed back circuit means including a timing network, a step-up transformer means having a primary and a secondary, said primary being included in said resistive circuits in series connection and said secondary being connected between the grid and the cathode of each discharge means in series therewith, said series connection including a grid leak for at least one of said discharge means, the transformer windings being equally directed to obtain a positive feed back, one of the transformer windings being further connected in a resonance circuit tuned to the fundamental frequency of the multivibrator system, the primary of the transformer having an impedance of small value relative to the resistance in said resistive circuits.

2. A multivibrator system according to claim 1, wherein each of said resistive circuits includes a resistance means connecting the respective anode to a source of anode voltage.

3. A frequency stable multivibrator system comprising first and second electron discharge means, each having an anode, a cathode and a grid, a resistive energizing circuit connected to the anode of each discharge means, positive feed back circuit means connecting the anode of each discharge means with the grid of the other discharge means, at least one of said feed back circuit means including a timing network, a step-up transformer means having a primary and a secondary, said primary being included in said resistive circuits in series connection and said secondary being connected in series with the cathodes of said discharge means, said grids being grounded by a circuit connection including a grid leak for each grid, the transformer windings being oppositely directed to obtain a positive feed back, one of the transformer windings being further connected in a resenance circuit tuned to the fundamental frequency of the multivibrator system, the primary of the transformer having an impedance of small value relative to the resistance in said resistive circuits.

4. A multivibrator system according to claim 1, wherein the secondary of the transformer is included in said resonance circuit tuned to the fundamental frequency.

5. A frequency stable multivibrator system comprising first and second electron discharge means, each having an anode, a cathode and a grid, a resistive energizing circuit connected to the anode of each discharge means, positive feed back circuit means connecting the anode of each discharge means with the grid of the other discharge means, at least one of said feed back circuit means including a timing network, a step-up transformer having a primary and a secondary, said primary being connected in series with the resistive circuit of one of the discharge means and said secondary being connected to the cathodes of the discharge means, the secondary being further connected in a resonance circuit tuned to the fundamental frequency of the multivibrator system, one of the grids being connected in a grounded circuit including a leak for the respective grid, the other grid being connected in series with the secondary and ground, the primary having an impedance of small value relative to the resistance in said resistive circuits.

References Cited in the file of this patent

UNITED STATES PATENTS

| | | |
|---|---|---|
| 2,419,772 | Gottier | Apr. 29, 1947 |
| 2,422,229 | Usselman | June 17, 1947 |
| 2,609,508 | Skellett | Sept. 2, 1952 |